United States Patent Office 3,428,658
Patented Feb. 18, 1969

3,428,658
PROCESS FOR THE SYNTHESIS OF
OLEFIN OXIDES
Robert James Kassal, Wilmington, Del., assignor to E. I.
du Pont de Nemours and Company, Wilmington, Del.,
a corporation of Delaware
No Drawing. Continuation-in-part of application Ser. No.
512,523, Dec. 8, 1965. This application Feb. 20, 1967,
Ser. No. 617,074
U.S. Cl. 260—348.5            8 Claims
Int. Cl. C07d 1/08, 5/14

ABSTRACT OF THE DISCLOSURE

A process for the synthesis of olefin oxides of 2–4 carbon atoms in the liquid phase by oxidation of the corresponding olefins with oxygen in the presence of a solvent mixture comprising a saturated cyclic hydrocarbon and a chlorinated benzene at elevated temperature. Olefin oxides are useful as comonomers in the production of molding resins.

---

This application is a continuation-in-part of application Ser. No. 512,523, filed Dec. 8, 1965, now abandoned.

This invention relates to olefin oxides and, more specifically, to a process for the synthesis thereof.

The prior art describes many liquid- and vapor-phase syntheses of olefin oxides, in which the starting materials are either saturated or unsaturated hydrocarbons. Olefin oxides are useful as comonomers with a variety of other comonomers in the production of polymers employed as molding resins and as coating compositions.

This invention provides a process for high-yield liquid-phase synthesis of olefin oxides containing 2–4 carbon atoms from the corresponding olefins, for example, ethylene, propylene, butylene, and isobutylene. According to the process of this invention, said olefins are heated at 100–200° C. in the presence of molecular oxygen and a solvent mixture, the latter comprising a chlorinated benzene and a saturated, cyclic hydrocarbon containing 5–12 carbon atoms.

The molecular oxygen employed in this process is supplied to the system as oxygen, air, or a gas mixture containing oxygen and an inert gas such as nitrogen, argon, neon, etc. Undiluted oxygen should generally not be added to the vessel at the initiation of the reaction, since flashing of the reaction can occur in that event. However, should the reaction be conducted in a closed system, after the oxidation has proceeded somewhat and part of the oxygen has been consumed, undiluted oxygen can be added, since any inert component of the gas mixture remains in the reaction system.

The composition of the solvent mixture is an important variable. The reaction is believed to proceed by a liquid-phase free-radical mechanism, in which the properties of the solvent system seem to be directing. A solvent mixture comprising a saturated, cyclic hydrocarbon containing 5–12 carbon atoms and a chlorinated benzene is far superior in terms of yield to each of these same solvents alone.

Illustrative of the cyclic hydrocarbons useful in the process of this invention are cyclopentane, cyclohexane, cycloheptane, cyclooctane, cyclononane, cyclododecane, and methylcyclohexane. Cyclohexane is the preferred cyclic hydrocarbon.

The chlorinated benzene useful as the other component of the solvent mixture can be a liquid at room temperature, or a solid at room temperature which melts below the reaction temperature. The chlorinated benzene component of the solvent mixture can also be a mixture of solid and liquid chlorinated benzenes. Illustrative of the chlorinated benzenes useful in this process are: monochlorobenzene, o-dichlorobenzene, m-dichlorobenzene, 1,2,3-, 1,2,4-, and 1,3,5-trichlorobenzene, 1,2,3,4-tetrachlorobenzene, and pentachlorobenzene. The preferred chlorinated benzenes are those which are liquid at room temperature and are of the formula $C_6H_{6-y}Cl_y$, where $y$ is 1–3.

The relative amounts of cyclic hydrocarbon and chlorinated benzene solvents can be varied considerably. About 10 parts (by weight) of cyclic hydrocarbon can be used with about 10–60 parts of a chlorinated benzene or a mixture of two or more chlorinated benzenes.

Two to forty parts of cyclic hydrocarbon can be used with 10 parts of olefin. For best results 5–20 parts of cyclic hydrocarbon are used with 10 parts of olefin. When the olefin is propylene and the cyclic hydrocarbon is cyclohexane, the latter represents molar ratio of cyclohexane to propylene of between 1/1 and 1/4.

The range of temperature useful in the process of this invention is 100–200° C. At temperatures near 100° C., a low rate of conversion is obtained. Above about 200° C., the reaction proceeds rapidly, but extreme care in the admission of oxygen or gas comprising oxygen (as mentioned above) to the reaction system is requisite to prevent flashing and to prevent degradation of olefin oxides to decomposition products thereof. In the synthesis of propylene oxide, higher yields are obtained in the temperature range 150–200° C. The preferred operating temperature in the synthesis of propylene oxide is 175–185° C.

Oxygen or a gas comprising oxygen can be added with the other materials before the temperature is raised. Alternately, oxygen or a gas comprising oxygen can be added after the reaction temperature has been reached. In either event, additional oxygen or gas comprising oxygen can be added as the reaction proceeds. Better results are obtained with a slow addition thereof (in small increments, for example) after the reaction temperature has been reached, since reaction under oxygen-starved conditions tends to prevent degradation of the olefin oxide to by-products thereof.

The operating pressure of the reaction system can be varied. When a gaseous mixture comprising oxygen and one or more other gases which are inert in the process (such as those mentioned above) is employed, the pressure of oxygen in the system should be in the range 60–340 p.s.i. Similarly, where pure oxygen is employed rather than a gaseous mixture, the pressure in the system should be in the range 60–340 p.s.i. When air is used as the gaseous mixture, pressures as low as 300 p.s.i. and as high as 1600 p.s.i. can be employed herein. Close control of the temperature should be maintained at high reaction pressures to prevent explosion of the reaction system.

Since this reaction proceeds by a free-radical mechanism, the presence of free-radical inhibitors should be minimized. The interior of the reaction vessel can, for example, be borate-pacified stainless steel, Hastelloy-C, platinum, or another material which will not inhibit free-radical reactions.

The following examples are presented to illustrate but not to restrict the present invention. All percentages and parts are expressed by weight, unless otherwise stated.

VI and VII illustrate the use of reaction vessels composed of materials other than borate-pacified stainless steel. In Examples VIII–X the chlorinated benzene component of the solvent mixture was varied.

The foregoing detailed description has been given for clearness of understanding only, and no unnecessary limitations are to be understood therefrom. The invention is not limited to the exact details shown and described since obvious modifications will occur to those skilled in the art.

TABLE

| No. | Vessel [a] | Cyclohexane (g.) | Propylene (g.) | Chlorinated Benzene (g.) | Air Addition | Time at 175° C.[b] (hr.) | Max. Press. (p.s.i.) | Products (Percent) | | | | | |
|---|---|---|---|---|---|---|---|---|---|---|---|---|---|
| | | | | | | | | Propylene oxide | Acetaldehyde | Propionaldehyde | Acetone | Acrolein | Allyl Alcohol |
| III | S.S. | 10 | 10 | 38 o-dichlor | 60 p.s.i. increm. at 175° C. | | 1,320 | 79.0 | 9.9 | 1.7 | 3.2 | | 6.2 |
| IV | S.S. | 20 | 10 | 38-o-dichlor | 60 p.s.i. increm. at 175° C. | 1 | 600 | 71.9 | 11.3 | 1.2 | 1.2 | 55 | 90 |
| V | S.S. | 10 | 20 | 38 o-dichlor | 60 p.s.i. increm. at 175° C. | | 1,000 | 65.8 | 17.7 | 1.5 | 4.2 | 2.9 | 7.9 |
| VI | H.C. | 6.5 | 7 | 18 o-dichlor | 600 p.s.i. at R.T. | ⅔ | 900 | 77.5 | 9.9 | 0.7 | 4.1 | 2.6 | 5.1 |
| VII | P.L. | 10 | 10 | 38 o-dichlor | 60 p.s.i. increm. at 175° C. | 1 | 600 | 76.3 | 8.5 | 1.6 | 2.9 | 2.1 | 8.5 |
| VIII | S.S. | 10 | 10 | 34 1,2,4-trichlor | 600 p.s.i. at R.T. | ½ | 900 | 72.6 | 13.8 | 0.8 | 4.5 | 3.0 | 5.4 |
| IX | H.C. | 6.5 | 7 | 15 o-dichlor, 19 1,2,3-trichlor. | 60 p.s.i. increm. at 175° C. | | 600 | 74.4 | 8.1 | 1.0 | 2.3 | 5.5 | 8.7 |
| X | S.S. | 10 | 10 | 38 monochlor | 60 p.s.i. increm. at 175° C. | | 775 | 69.1 | 13.4 | 1.3 | 3.3 | 3.9 | 8.9 |

[a] Vessels used were 180-ml. borate-pacified stainless-steel shaker tube (S.S.), 117-ml. Hastelloy-C shaker tube (H.C.), and 180-ml. platinum-lined shaker tube (P.L.).
[b] The time refers to the duration, after the completion of the addition of air (in either small increments or at a single loading), for which the tube was held at 175° C. In Examples III, V, IX, and X, the tube was cooled soon after addition of air was completed.

However, percentages of products reported in the examples are gas chromatographic area percentages which approximate mole percentages.

EXAMPLE I (A) In a 180-ml. borate-pacified stainless-steel shaker tube were placed 10 grams of cyclohexane, 10 grams of propylene, and 38 grams of o-dichlorobenzene. Before the temperature was raised, 600 p.s.i. of air was added to the tube. The tube was heated at 175° C. for 30 minutes, then cooled. The bomb reached a pressure of 950–1000 p.s.i. The products (analyzed by gas chromatography) were: 72.8% propylene oxide, 13.5% acetaldehyde, 0.4% propionaldehyde, 7.7% acetone, 5.5% allyl alcohol.

(B) This run was identical to that in section A except that a nonpacified stainless-steel tube was used. Products were 58.9% propylene oxide, 28.2% acetaldehyde, 1.0% propionaldehyde, 4.4% acetone, 7.5% allyl alcohol.

EXAMPLE II

This example is similar to Example I(A), except oxygen was added after the tube had reached reaction temperature, rather than at room temperature.

In a 180-ml. borate-pacified stainless-steel shaker tube were placed 10 grams of cyclohexane, 10 grams of propylene, and 38 grams of o-dichlorobenzene. The tube was heated to 175° C. with constant shaking, then air was admitted in eight 60-p.s.i. increments at 20-minute intervals until the tube pressure was 600 p.s.i. The reactor was held at this state for 1 hour, then cooled. The products included 83.3% propylene oxide, 9.7% acetaldehyde, 0.9% propionaldehyde, 6.0% allyl alcohol.

EXAMPLES III–X

In these examples addition of air to the vessel was accomplished either by a single loading as in Example I or by addition of air in 60-p.s.i. increments at 20-minute intervals as in Example II. Otherwise, the techniques were similar. Data are found in the table.

Example III illustrates the use of an operating pressure twice that of Example II. In Example IV there was a marked increase in the molar ratio of cyclohexane to propylene, and in Example V a decrease in same. Examples

I claim:

1. A process for the synthesis of olefin oxides of 2–4 carbon atoms by the reaction of the liquid phase of the corresponding olefin with oxygen, said process comprising introducing into a pressure vessel said olefin and a solvent mixture which comprises a saturated, cyclic hydrocarbon of 5–12 carbon atoms and a chlorinated benzene, there being about 10–60 parts by weight of said chlorinated benzene to 10 parts of said cyclic hydrocarbon, adding to the pressure vessel a gas comprising molecular oxygen, and maintaining said vessel under an oxygen pressure of about 60–340 p.s.i. at a temperature in the range 100–200° C., whereby at least part of said olefin is converted to said olefin oxide.

2. A process according to claim 1 wherein said gas comprising molecular oxygen is air and wherein said pressure is about 300–1600 p.s.i.

3. A process according to claim 1 wherein said cyclic hydrocarbon is cyclohexane and said chlorinated benzene is of the formula $C_6H_{6-y}Cl_y$, where $y$ is 1–3.

4. A process according to claim 1 wherein said olefin oxide is ethylene oxide and said olefin is ethylene.

5. A process according to claim 1 wherein said olefin oxide is butylene oxide and said olefin is butylene.

6. A process according to claim 1 wherein said olefin oxide is propylene oxide and said olefin is propylene.

7. A process according to claim 6 wherein said cyclic hydrocarbon is cyclohexane and said chlorinated benzene is of the formula $C_6H_{6-y}Cl_y$, where $y$ is 1–3, said gas comprising molecular oxygen is air and said pressure is about 300–1600 p.s.i. at 150–200° C.

8. A process according to claim 7 wherein said temperature is in the range 175–185° C.

References Cited

UNITED STATES PATENTS 3,238,229  3/1966  Reid _____ 260—348.5

NORMA S. MILESTONE, Primary Examiner.

U.S. Cl. X.R.

260—348.5